United States Patent
Salah et al.

(10) Patent No.: US 12,421,988 B2
(45) Date of Patent: Sep. 23, 2025

(54) PILOT CONTROL UNIT FOR AT LEAST ONE VALVE DRIVE OF A HYDRAULIC VALVE AND METHOD FOR OPERATING SAME

(71) Applicant: Bucher Hydraulics GmbH, Klettgau (DE)

(72) Inventors: Gerd Salah, Hennef-Blankenbach (DE); Steffen Hartmann, Wutöschingen (DE)

(73) Assignee: Bucher Hydraulics GmbH, Klettgau (DE)

( * ) Notice: Subject to any disclaimer, the term of this patent is extended or adjusted under 35 U.S.C. 154(b) by 178 days.

(21) Appl. No.: 18/031,449

(22) PCT Filed: Oct. 13, 2021

(86) PCT No.: PCT/EP2021/078354
§ 371 (c)(1),
(2) Date: Apr. 12, 2023

(87) PCT Pub. No.: WO2022/079119
PCT Pub. Date: Apr. 21, 2022

(65) Prior Publication Data
US 2023/0375015 A1    Nov. 23, 2023

(30) Foreign Application Priority Data
Oct. 16, 2020   (DE) ..................... 10 2020 127 383.5

(51) Int. Cl.
*F15B 21/08*    (2006.01)
*F15B 13/02*    (2006.01)

(52) U.S. Cl.
CPC .............. *F15B 21/08* (2013.01); *F15B 13/02* (2013.01)

(58) Field of Classification Search
CPC .... F15B 13/0444; F15B 13/044; F15B 13/04; F15B 13/0402; F15B 2013/0409;
(Continued)

(56) References Cited
U.S. PATENT DOCUMENTS
2008/0121830 A1    5/2008   Thierry et al.

FOREIGN PATENT DOCUMENTS
DE    102005060414 A1    6/2007
DE    102014017413 B3    2/2016
(Continued)

OTHER PUBLICATIONS
DE 102018202258 A1, Machine Translation (Year: 2018).*
(Continued)

*Primary Examiner* — Daphne M Barry
(74) *Attorney, Agent, or Firm* — BainwoodHuang

(57) ABSTRACT

A pilot control unit is for at least one valve drive of a hydraulic valve with a valve slide. The valve slide can be adjusted by the valve drive, in order to supply hydraulic lines with hydraulic fluid through the hydraulic valve. The pilot control unit is set up to supply electronics and a power end stage for actuating an electrical actuator of the valve drive with electrical energy and operating commands and there is a parametrization module in the pilot control unit for this purpose, in which operating parameters for the operation of the at least one hydraulic valve by the valve drive thereof are stored.

12 Claims, 4 Drawing Sheets

Figure 1A:
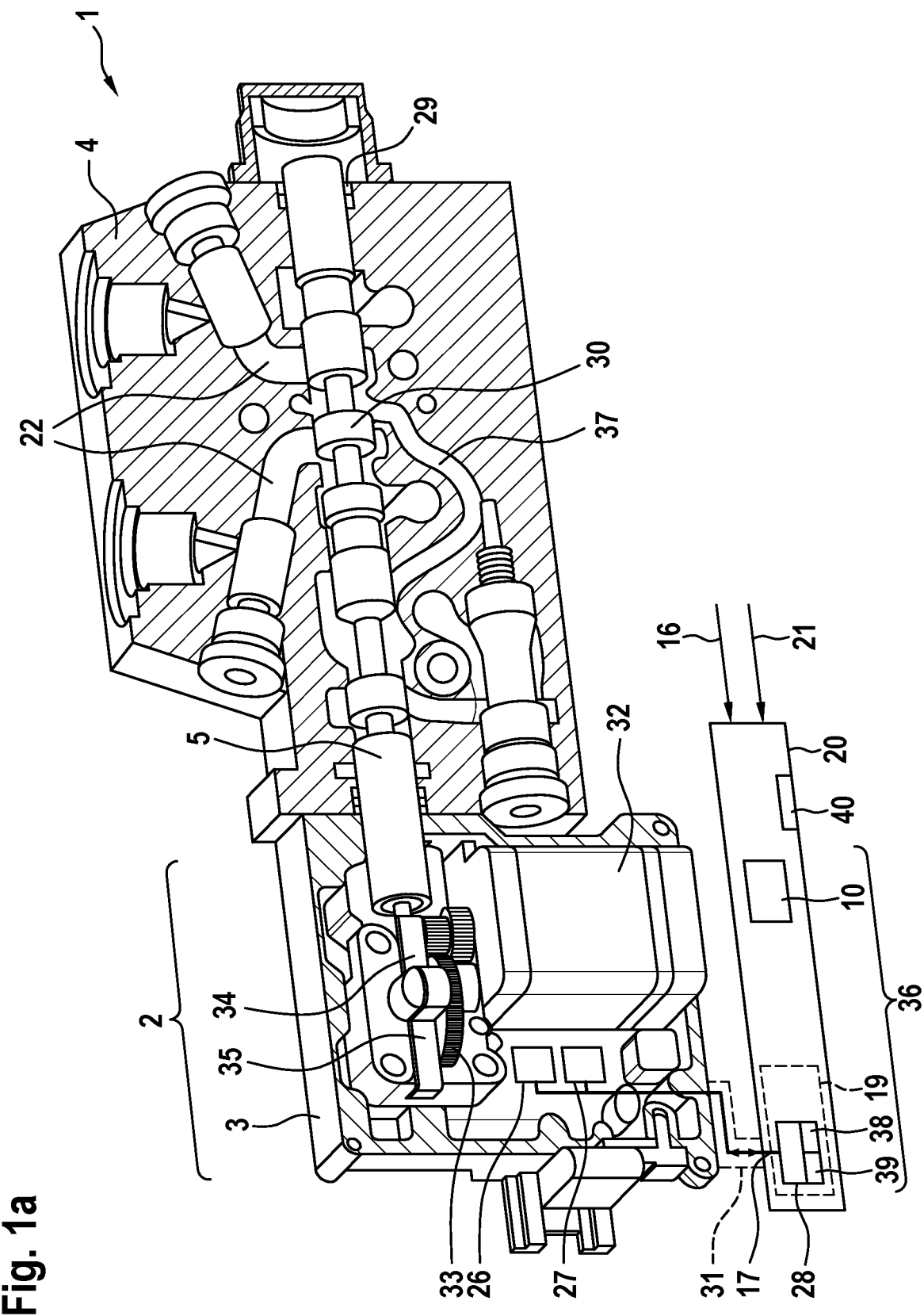

(58) Field of Classification Search
CPC ........ F15B 2013/041; F15B 2013/0412; F15B 2211/8623; F16K 31/047; F16K 31/52483; F16K 31/54
See application file for complete search history.

(56) References Cited

FOREIGN PATENT DOCUMENTS

| | | | |
|---|---|---|---|
| DE | 102018202258 | A1 | 8/2019 |
| EP | 3121485 | A1 | 1/2017 |
| EP | 3483454 | A1 | 5/2019 |
| WO | 2004016900 | A1 | 2/2004 |
| WO | 2017045701 | A1 | 3/2017 |
| WO | 2021180508 | A1 | 9/2021 |

OTHER PUBLICATIONS

Mueller G: "On Board Elektronik (OBE) Elektronische Steuergeraete Fuer Mobilhydraulik", Steuerungen Und Regelungen, O & P—Oelhydraulik Und Pneumatik, Oct. 1, 2002, pp. 594/595, XP001185084, ISSN: 0341-2660.

* cited by examiner

PILOT CONTROL UNIT FOR AT LEAST ONE VALVE DRIVE OF A HYDRAULIC VALVE AND METHOD FOR OPERATING SAME

The present invention relates to devices and methods for the safe and economical operation of hydraulic valves, even under harsh operating conditions. Hydraulic valves are used in construction machinery, agricultural vehicles and mining, among other things. Particularly with applications of this kind, it is crucial for the hydraulic valves to be very resilient to external influences, in particular also vibrations, and for a safe adjustment of desired valve settings to be possible in all operating situations.

Typical hydraulic valves for the above applications have a valve slide which is moved by a valve drive with a motor (also referred to as an actuator). The valve slide can therefore be moved into different positions, as a result of which hydraulic lines can be (partially) opened or closed as required. Actuators and hydraulic valves of this kind are described in EP 3 121 485 A1 or in US 2008/0121830 A1, for example.

Hydraulic valves of this kind are routinely modular in design, meaning that different tasks are distributed to different modules. A so-called pilot control unit is connected to the actual valve drive via electrical lines. In this case, a single pilot control unit can be set up to supply multiple valve drives with electrical energy. As an actuator, each valve drive may comprise a step motor, for example, the power end stage thereof and electronics assigned to the step motor.

In principle, each individual valve and its valve drive are individually set up and parameterized for the respective application. This can be explained based on the example of a series of valves used to operate an excavator arm. For each valve, there is a specific requirement as to which volume flows are to be supplied at which pressure in the respective valve setting, so that a hydraulic system connected to this valve is able to perform its tasks during the operation of the excavator arm. In order to operate a dual hydraulic cylinder to lift the excavator arm, for example, higher pressures and volume flows are required than for an individual cylinder for tipping the excavator bucket. So that these requirements can be implemented, the individual setting and parameterization takes place within the framework of what is known as the application (the setting of the individual valve for the respective use). The implementation of specific requirements calls for mechanical changes/setting on the valve itself, for example on the valve slide. A large range of requirements may, however, also be met through pure parametrization in the valve drive. This takes place through the storage of corresponding data, in particular parameters, characteristic diagrams, etc. in the valve drive.

It has hitherto been customary for the electronics arranged in a valve drive also to contain the entire parametrization of the valve drive for the respective application and to perform control tasks. Hence, calibrating data/characteristic diagrams and the like are stored there and control loops realized. Operating commands which are delivered to the hydraulic valves by a higher-level control (e.g. an excavator control unit) are converted in the respective valve drive. The pilot control unit in this constellation only supplies commands in the form of data and receives a feedback signal indicating that the commands have been correctly implemented or indicating any faults. Typically, combined power supply and data lines are used for the power supply to the valve drive and communication between the pilot control unit and the valve drive.

The pilot control unit has therefore hitherto been used purely as a support, in order to create an error-free/failsafe operating environment for the individual valves. The parametrization is dealt with along with other, possibly also mechanical individualizing interventions on the valve itself, as part of the valve itself or as belonging to the valve. This formulation has hitherto also always been regarded as suitable, because parametrization represents an alternative procedure for the mechanical modification of the respective valve.

This distribution of tasks has various disadvantages, however. Since a particular valve drive can be used for different valves which require different parametrization and controls, the electronics for each different individual application must be different, or it must be possible to reprogram the electronics in each valve drive. Even if the requirements change for a given application, intervention in the electronics is required. This imposes high demands in terms of logistics and stocks of spares. Moreover, the valve drives are frequently exposed to greater mechanical loads than the pilot control units, which can be arranged in more protective locations, meaning that the local electronics have to have a very robust design or are more susceptible to faults.

The invention is based on the object of avoiding or mitigating these disadvantages and realizing an economically and technically advantageous distribution of tasks between the pilot control unit and valve drive.

A pilot control unit and a method as disclosed herein are used to achieve these objects. Advantageous embodiments and/or developments, to which the invention is not however limited, are specified herein in each case. The invention also comprises a computer program product comprising commands which cause the pilot control unit which has been described to carry out the described method along with valve drives.

A pilot control unit for at least one valve drive of a hydraulic valve with a valve slide is to be described here, wherein the valve slide can be adjusted by the valve drive, in order to supply hydraulic lines with hydraulic fluid through the hydraulic valve, wherein the pilot control unit is set up to supply electronics and a power end stage for actuating an electrical actuator of the valve drive with electrical energy and operating commands and there is a parametrization module in the pilot control unit for this purpose, in which operating parameters for the operation of the at least one hydraulic valve by the valve drive thereof are stored.

Using the parametrization module, some functions which have hitherto been performed by the electronics in the valve drive have been moved from there to a pilot control unit, which therefore becomes a pilot control unit with extensive functions. Figuratively speaking, the "intelligence" of the valve drive is moved into the pilot control unit, so that what is left in the valve drive is "dumb" electronics with purely "administrative tasks", but without "control functions". From a technical point of view, this means that the pilot control unit has stored the parametrizations for the valve drives that it supplies and also contains control loops and undertakes control tasks. The electronics in the valve drive only receive data when the actuator is intended to carry out any movements/steps and pass these on in a suitable form to the actuator and the power end stage thereof. The implementation or possible fault are reported to the pilot control unit, which then takes over the control of the valve drive in accordance with the respective parametrization using this information and generates commands for the next movements/steps. In this way, a valve drive can be used for various applications without being changed or reprogrammed or used in a planned application for new requirements. Changes are made in the pilot control unit or in any event are stored there.

Since a pilot control unit is only connected to other components via electrical lines, it can be arranged in a protected, easily accessible location where necessary, even if it is desirable for safety reasons for the connection paths to the valve controls to be kept as short as possible and for the smallest possible number of potential interference points (deflections etc.) to be provided. It is far simpler for an exchange of storage data or a reprogramming to be carried out there. Moreover, an interface for processes of this kind need not be provided at each valve drive, but only one at the pilot control unit for a plurality of valve drives. A more powerful microprocessor can also be provided there, which contains the parametrization of many different applications and can assume the control of multiple valve drives. This is more cost-effective than providing a microprocessor for control in each valve drive. If wireless communication is required for updating or reprogramming, this can also be achieved more easily in only one pilot control unit than in numerous valve drives.

Particularly preferably, there is at least one control loop for controlling the valve drive and a bidirectional data transmission to the valve drive in the pilot control unit.

The control loop is realized on a microcontroller. From the point of view of the control loop, the hydraulic valve is the control path being controlled. The control loop receives data on the operation of the hydraulic valve via a bidirectional data line between the hydraulic valve, or the valve drive thereof, or the electronics. This may be electrical currents occurring there, for example, forces or also information on settings of the valve slide. These data can be regarded as control variables. They are used by the control loop along with control data received from the pilot control unit, in order to calculate operating commands for the hydraulic valve or the valve drive, etc.

The bidirectional data transmission is the administration of a bus system between the pilot control unit and the valve drives, for example, which bus system supplies a bidirectional data line via an actuator power supply line, with which the valve drives and the pilot control unit can communicate with one another.

It is moreover advantageous for the pilot control unit to have an electrical energy store and for the electrical energy store to be set up so that the valve slide is moved by the valve drive and energy stored in the electrical energy store from any possible valve slide position into a cutout position.

This kind of set-up of the electrical energy store may be realized by a control set up for this purpose in the pilot control unit or on a microprocessor with data store. The other functions of the pilot control unit described here may likewise be realized on this control.

According to the prior art, it is customary for the valve slide to be moved by means of at least one return spring into an inoperative position or to be held in this position when the drive is not active. This is described in EP 3 483 454 A1, for example. In this way, a safe cutout of a hydraulic valve of this kind is guaranteed, particularly also when a power supply drops out. If the hydraulic valve is suitably incorporated in the activation of a controlled movement element (excavator bucket, fork of a tractor, etc.), safe operation of the controlled movement element can also be guaranteed by a safe cutout of the hydraulic valve.

The return spring which is described also has its disadvantages, however. On the one hand, it is an additional component which increases the cost of the valve and requires additional installation space which is particularly unfavourable for many uses. Moreover, the actuator must not only be designed for a movement of the valve slide against customary friction, but it must also overcome the spring force of the return spring. This requires a correspondingly powerful motor, which can lead overall to corresponding energy losses during operation. In principle, the entire drive of the valve slide, including a gear box if there is one, must be designed in such a manner that the return spring can move the motor.

It is therefore particularly advantageous and is described below as the preferred exemplary embodiment for the pilot control unit to have a control and an electrical energy store, wherein the control and the electrical energy store are set up to move the valve slide by means of the valve drive and energy stored in the electrical energy store from each possible valve slide position into a cutout position.

A hydraulic valve module with the pilot control unit described comprises at least one, and possibly multiple, hydraulic valves which are arranged behind one another in a row, where appropriate, in a valve block. The hydraulic valve module preferably further comprises for each hydraulic valve a valve drive with a separately actuable electrical actuator, with which the respective hydraulic valve, or else the hydraulic lines of the respective hydraulic valve, can be selectively supplied (in accordance with the requirements of a higher-level operating control) with hydraulic fluid (in other words, can be selectively opened, closed or partially opened and/or closed).

The electrical actuator of a hydraulic valve comprises in particular a step motor with which the position of the valve slide can be adjusted, in order to supply hydraulic lines with hydraulic fluid through the hydraulic valve.

The electrical actuator may, however, also comprise other kinds of electrical drive motors. In principle, brushless motors (BLC motors, BLC=brushless contact) are, above all, suitable for the electrical actuator, which also include the step motor. However, different kinds of electrical drive motors can also be used in the electrical actuator. In principle, however, it is also advantageous for an electrical drive motor to be used in the electrical actuator, with which particular positions of a movable element of the motor can be set by energizing the motor. Motors in which this adjustability of the position is possible even without additional positional sensors and positional control are particularly preferably used. This applies in particular to the aforementioned step motors. However, actual values or measured values can then be determined, where appropriate, via the currents or voltages occurring in the motor/actuator.

The electrical drive motor of the actuator is preferably a rotational motor with a stator and a rotor, wherein the rotor actuates the valve slide via a gear. In preferred embodiments, the gear comprises a rack for converting a rotation of the drive motor into a linear movement of the valve slide.

In other design variants, the electrical drive motor may also be a linear motor which directly produces a linear movement which is particularly preferably transmitted to the valve slide via a rigid connection.

It is particularly preferable for the control to be configured as an emergency control and the electrical energy store as an emergency power supply and for them to be set up to supply electrical energy for at least one emergency cutout, when a fault is detected in an external power supply of the hydraulic valve module, wherein the emergency cutout is set up to move the valve slide from each possible valve slide position into the cutout position.

The electrical energy store has at least one electrical energy storage cell in which the actual storage of the electrical energy takes place. In addition, the electrical energy store may comprise further components. These are preferably components which monitor the feeding of electrical energy into the energy store and/or the delivery of electrical energy from the energy store. For example, a charging control unit for controlling the charging and discharging of the electrical energy storage cell may be a further component of the electrical energy store.

The cutout position of the valve slide is, in particular, a position in which all hydraulic lines are closed by the hydraulic valve. An emergency cutout takes place, in particular, when a fault is detected in an external power supply to the hydraulic valve module. An external power supply in this case is understood to mean all components, including electrical lines, for supplying the hydraulic valve with electrical energy which lie outside the hydraulic valve module. A failure may therefore occur on account of defective components or lines. Straight lines and the connections thereof outside the hydraulic valve module are at risk during everyday operation. While according to the prior art at least one return spring ensured that during a power failure, the valve was moved into a safe cutout position, according to the invention the actuator or motor is used for this purpose, although this requires a certain minimum energy which is now held constantly ready by the electrical energy store. The control uses this energy to perform the desired cutout action by means of the actuator. On account of the ever-present friction, which can also be increased where appropriate by suitable damping means, the valve then remains in this safe state, even during the vibrations which occur during normal use. In order to exclude faults between the electrical energy store, the control and the actuator insofar as is possible, these components are arranged spatially very close to one another. This is also expressed by the term "hydraulic valve module" which describes a compact, integrated design of a group of hydraulic valves, associated actuators and the other components provided (control, electrical energy store, etc.). A design of this kind is also referred to as a modular structure in this case. The module is preferably integrated in a larger machine (tractor, excavator, etc.) so as to be exchangeable in one piece and is also housed where possible in a joint protective housing, as has already been explained above.

In a preferred embodiment, a plurality of hydraulic valves is connected to the pilot control unit and can be supplied with data by said pilot control unit.

The electrical energy store is preferably also designed in such a manner that the valve slide of each hydraulic valve in the hydraulic valve module can be moved from any arbitrary position into the cutout position (provided in each case). What this means is that even in the event that all valve slides are located in a position from which the energy expenditure needed in order to move the valve slide back into the cutout position is maximal, the energy available in the electrical energy store is nevertheless sufficient to move all valve slides of the hydraulic valve module back into the cutout position.

Moreover, it is particularly preferred for the parametrization module, the control loop and the bidirectional data detection each to be designed in such a manner that they can be used for multiple hydraulic valves. Alternatively, a control set up on a microprocessor with data stored is set up in such a manner that it can generate operating commands for a plurality of hydraulic valves, including under operating conditions. For example, the pilot control unit or the control arranged therein may be set up in such a manner that five, ten or possibly also 20 hydraulic valves can thereby be supplied with operating commands.

The pilot control unit may, in particular, have a protective circuit and/or further (different) joint components for multiple hydraulic valves, so that they need not be individually present for each actuator. A controller in the pilot control unit can therefore take on functions for multiple valves, for example checking the integrity of the signal transmission in each case, limiting the starting current, detecting the failure of the external power supply and initiating emergency cutouts.

By using a pilot control unit for multiple hydraulic valves in a hydraulic valve module, it is also possible for signal and current-carrying lines to be looped. Particularly preferably, individual hydraulic valves are connected to one another in the hydraulic valves by a series connection, wherein each hydraulic valve or each actuator of a hydraulic valve is connected to the adjacent hydraulic valves or the actuator thereof. In this case, hydraulic valves at the start of a series connection or at the end of a series connection usually have an adj acent hydraulic valve and hydraulic valves within the series of the series connection two adjacent hydraulic valves. The pilot control unit is then preferably only connected to a first hydraulic valve and/or to a final hydraulic valve of the series connection. The signals and the current for further hydraulic valves of the series connection are fed or looped through by the connections of the hydraulic valves/actuators to one another as far as the hydraulic valve/actuator concerned in each case.

As has already been described above, it is advantageous for the pilot control unit to have an interface for data exchange and/or reprogramming. The pilot control unit preferably contains the calibration data, parameters and control loops needed for at least one valve drive, and it is set up to operate the valve drive as an actuating element of the control loops and to process actual valves of the valve drive.

Actual values of this kind may be measured values, for example, which are determined using electronics in the valve drive. The electronics in the valve drive preferably have a storage means in which actual valves of this kind are stored at least for a given period of time and which can also be accessed subsequently where appropriate, in order to determine the actual values from this storage means. This may be very helpful in fault diagnosis, for example.

Particularly preferably, two or more of the functions of the parametrization module, control, control loops and/or bidirectional data transmission are integrated in a microprocessor with a data store. There is preferably precisely one microprocessor in the pilot control unit, in which all essential functions take place. The microprocessor is preferably configured in such a manner that there is no overloading, even when the maximum number of data throughput events takes place (e.g. when all connected hydraulic valves have to receive new operating commands simultaneously).

A description is also to be provided here of a novel method for operating a valve drive for a hydraulic valve, wherein the valve drive receives operating commands from a separate pilot control unit via a bidirectional data transmission and sends actual values of the hydraulic valve back to the pilot control unit via the bidirectional data transmission, and wherein the pilot control unit contains operating parameters stored in a parametrization module for the valve drive and hydraulic valve, which are used along with the actual values and external inputs to generate the operating commands.

The advantages and embodiment features described for the pilot control unit are applicable and transferrable to the method which has been described.

It is particularly advantageous for the pilot control unit to take over control of the valve drive by means of control loops realized in the pilot control unit and the stored operating parameters and for no control loops to be realized in the valve drive itself and for no operating parameters to be stored.

Moreover, it is advantageous for the pilot control unit to supply a plurality of valve drives with operating commands in parallel or in series and to store operating parameters for all these valve drives.

Moreover, a computer program product is to be described here which has commands which cause a described pilot control unit to work according to the method described.

The computer program product may be implemented on a microprocessor with a data store of the pilot control unit, for example, or in a control of the pilot control unit.

Figure 1B:
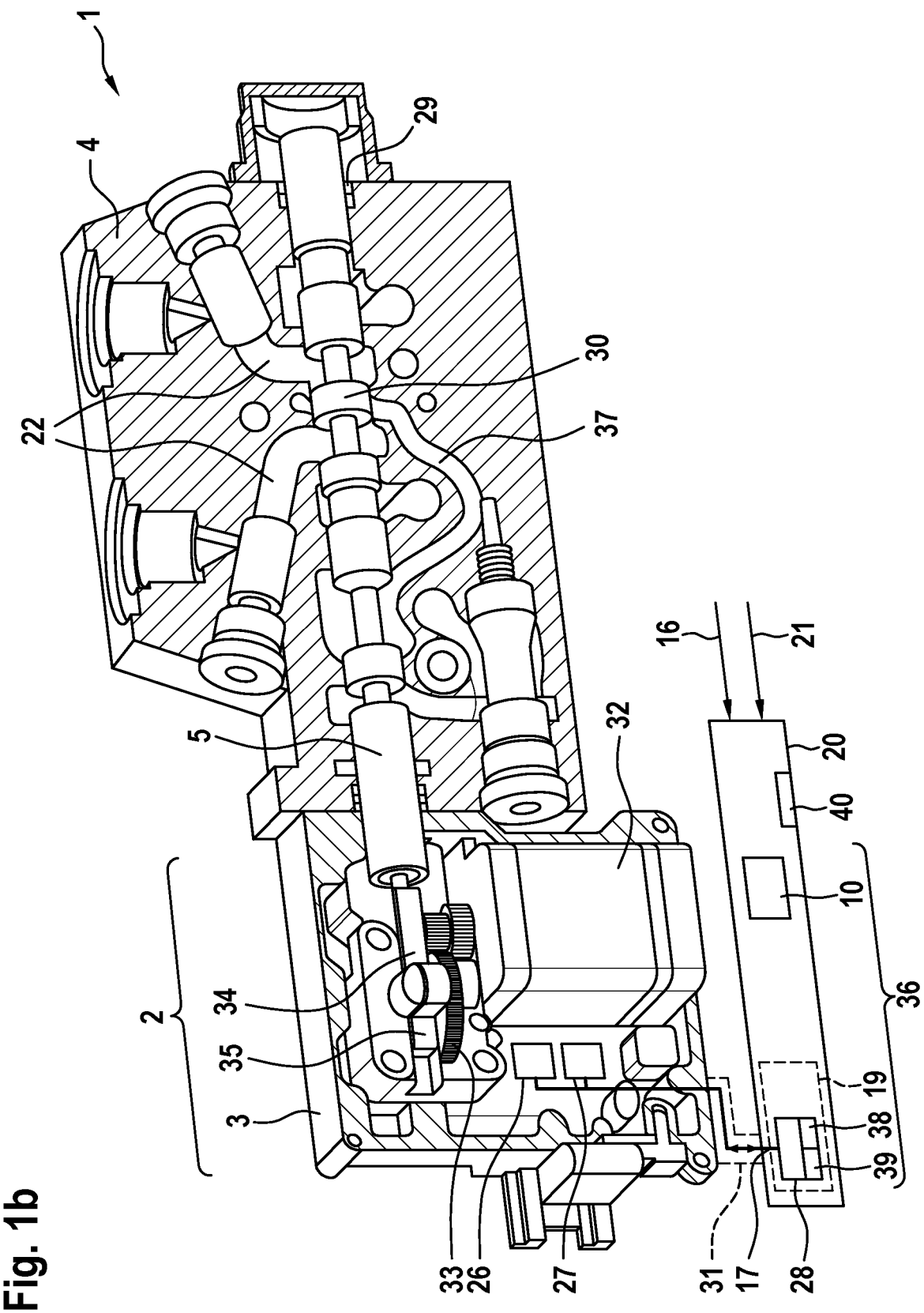
Figure 2:
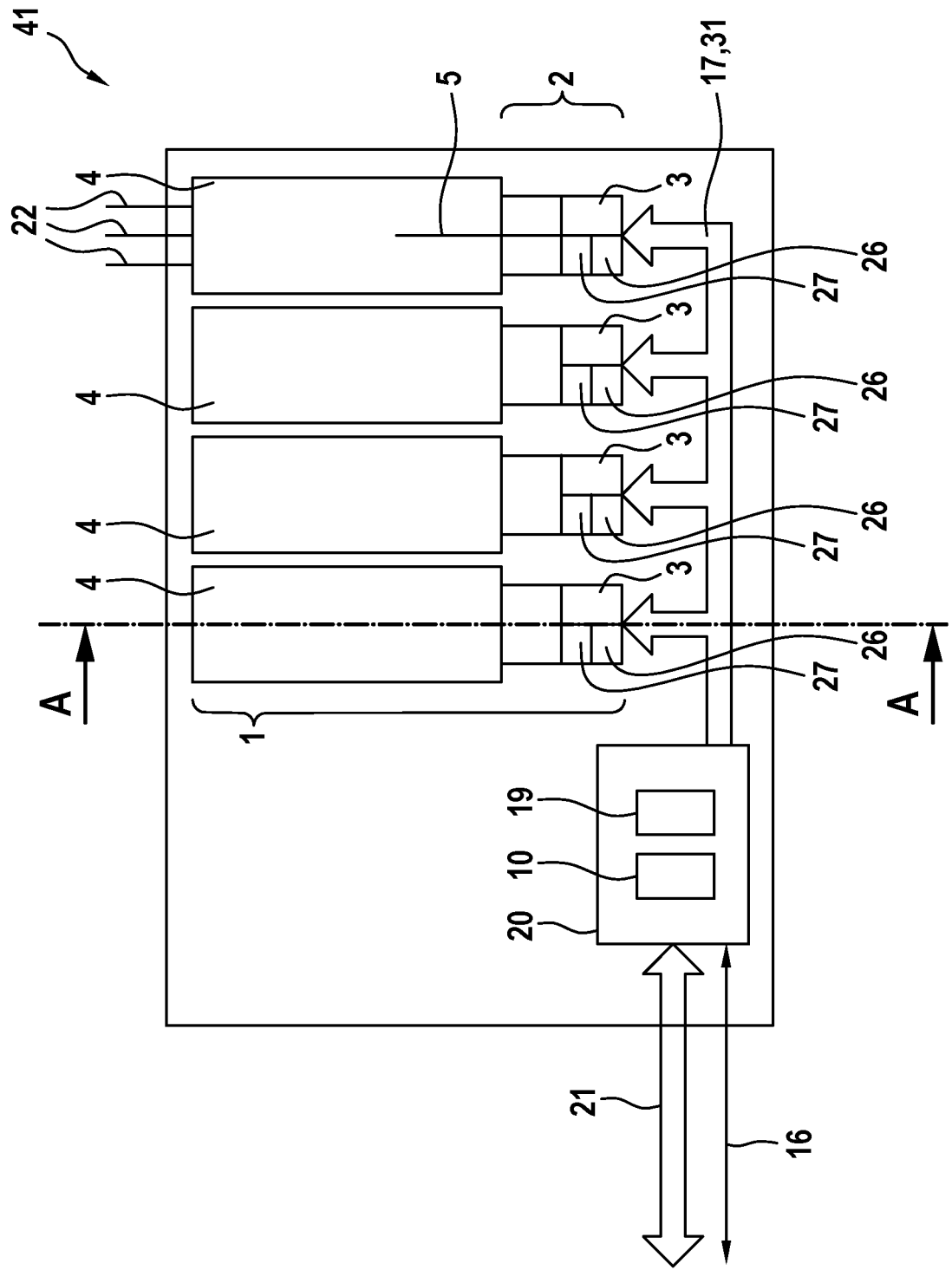
Figure 3:
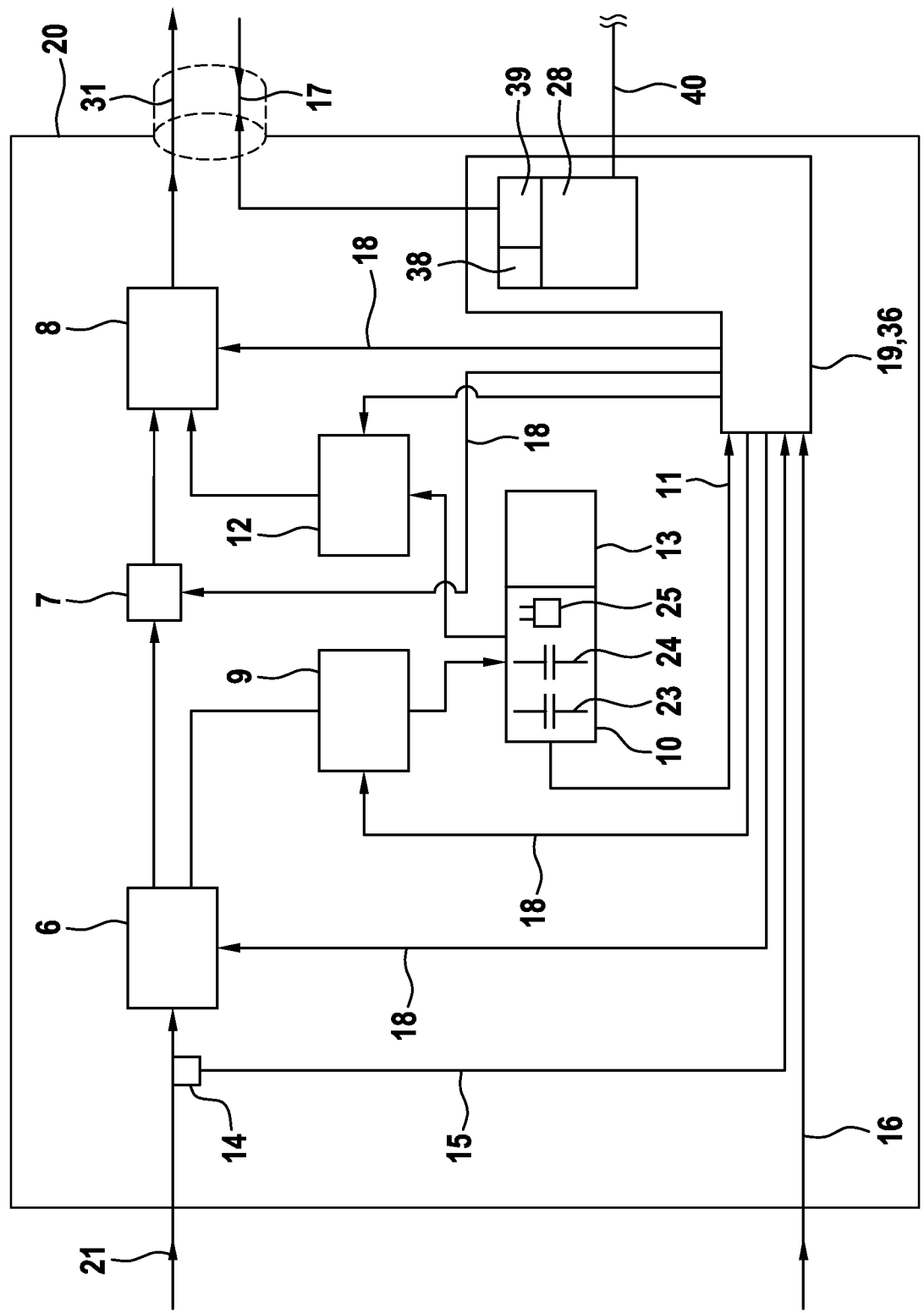

The pilot control unit described is explained in greater detail below with the help of the figures. It should be pointed out that the figures are only schematic and are intended to explain the principles of the invention dealt with here. Individual features or functions of the exemplary embodiment which are described may also be combined meaningfully with one another in the context of the invention in a manner other than that shown. In the drawing:

FIG. 1a shows a schematic cross section through a single hydraulic valve of a hydraulic valve module with the valve slide in a deflected position, FIG. 1b shows a schematic cross section through a single hydraulic valve of a hydraulic valve module in a position of the valve slide in the cutout position, FIG. 2 shows schematically a hydraulic valve module according to the invention with its connections, and FIG. 3 shows schematically a pilot control unit according to the invention with its components and connections.

FIG. 1a and FIG. 1b show schematically the cross section through a hydraulic valve 1 with a valve drive 2 and an actuator 3, wherein this hydraulic valve 1 is an integral part of a hydraulic valve module 41 described here. FIGS. 1a and 1b show a section through a hydraulic valve module 41 of this kind which runs through one of the hydraulic valves 1. The hydraulic valve 1 has a hydraulic valve block 4. This hydraulic valve block 4 may also be a joint block, in which multiple hydraulic valves 1 are arranged (behind one another). The hydraulic valve 1 comprises hydraulic lines 22 in each case which may be configured as bores in the hydraulic valve block 4, for example. A control bore 29 is also provided in the hydraulic valve block 4, in which a valve slide 5 is arranged. There are control structures 30 on the valve slide 5 which interact with the hydraulic lines 22 differently, depending on the position of the valve slide 5, and can selectively supply them with hydraulic fluid or open, close and/or partially open or and/or partially close them. In order to illustrate the mode of operation of the hydraulic valve 1, different positions of the valve slide 5 are illustrated in FIGS. 1a and 1b. The position of the valve slide 5 can be set using the motor/actuator 3. In customary design variants, the motor/actuator 3 is configured with an electric motor 32 and a gear 33, via which the electric motor 32 drives a pinion 35 which acts on a rack 34 connected to the valve slide 5. In the sectional depiction according to FIGS. 1a and 1b, the pinion 35 is arranged behind the rack 34 and concealed by the rack 34. The current position of the valve slide 5 can then be set via the rack 34 using the motor/actuator 3. FIG. 1a shows by way of example a position of the valve slide 5, in which one of the hydraulic lines 22 in the hydraulic valve block 4 is connected to a supply channel 37 for supplying hydraulic oil, in order to supply this hydraulic line 22 with hydraulic oil. The valve slide 5 preferably has a designated cutout position. Also depicted schematically in FIGS. 1a and 1b are a pilot control unit 20 for controlling the valve drive 2. The valve drive 2 has electronics 26 and a power end stage 27 in each case and these are used to supply the actuator 3 in the valve drive 2. The electronics 26 are set up to activate the power end stage 27 to supply power to the actuator 3, in order to supply electrical energy to the actuator 3, as is required in accordance with the operating commands received from the electronics 26. The electronics 26 may, in addition, also detect and transmit measured variables in the valve drive 2.

The valve drives 2 are connected to the pilot control unit 20 via an actuator power line 31. The actuator power line 31 is also simultaneously used as a bidirectional data line 17. Control data are transmitted from the pilot control unit 20 to the electronics 26 via the actuator power line 31 operated as a bidirectional data line 17 using a bus system. Actual values or measured variables from the valve drive 2 are transmitted back to the pilot control unit 20 in exactly the same manner.

The pilot control unit 20 contains an electrical energy store 10 and a control 19. The control 19 performs the control tasks described above and supplies the electronics 26 of the valve drive 2 with control commands. The electrical energy store 10 may, where appropriate, ensure a power supply to the valve drive 2. Electrical energy is stored in the electrical energy store 10 and this is sufficient to move the valve slide 5 from any possible valve slide position into the cutout position. Performing a cutout of this kind (including an emergency cutout where appropriate) is preferably likewise controlled by the control 19.

In order to undertake the control of the valve drives 2, the control 19 preferably has a parametrization module 28 in the pilot control unit 20, in which operating parameters for the respective hydraulic valve 1 are stored. Moreover, the control 19 is set up to receive measured values from the valve drive 2 (on the electronics 26) and, based on control data transmitted from a higher-level control 19, to allow controlled operation of the hydraulic valve. A control loop 38 is preferably also provided for this purpose. A bus system for communication between the control 19 or the pilot control unit 20 and the electronics 26 or the valve drive 2 can be realized with the bidirectional data transmission 39 depicted schematically here.

All these functions can be implemented on a microprocessor with a data store 36.

The pilot control unit 20 is preferably connected to an external power supply 21 in order to supply power to the pilot control unit 20 and the hydraulic valves 1. Moreover, the pilot control unit 20 is connected by a data supply line 16 to a higher-level control, for example to an excavator control unit, in the event that the hydraulic valve 1 is used in an excavator.

FIG. 2 shows a hydraulic valve module 41 as described with four hydraulic valves 1 in this example, which are depicted schematically here. Shown in each case is the hydraulic valve 1 with the hydraulic valve block 4 and the valve drive 2 comprising the actuator 3 and also the power end stage 27 and the electronics 26. The actuator 3 is set up in each case to move the valve slide (not shown here) of the respective hydraulic valve 1. The actuators 3 are connected to a pilot control unit 20 via the actuator power line 31 which also acts as the bidirectional data line 17 via a bus system, said pilot control unit supplying energy and control signals to them. The pilot control unit 20 is supplied with power via an external power supply 21 and it receives operating commands for control of the hydraulic valves 1 via a data supply line 16. The control 19 and the electrical energy store 10 in this case are arranged in the pilot control unit 20. For orientation purposes, the sectional direction A-A is depicted in FIG. 2. The depiction in FIGS. 1a and 1b show a section of this kind through the hydraulic valve 1.

FIG. 3 shows schematically and with further details a possible structure of a pilot control unit 20 as described (as has already been depicted in FIG. 2) with its different components. The pilot control unit 20 is connected at the input end to an external power supply 21 and data lines 16 for the supply and control of actuators 3. At the output end, an actuator power line 31 and a bidirectional data line 17 start from the pilot control unit 20. As indicated schematically here, the actuator power line 31 and the bidirectional data line 17 are configured with a (joint) physical combined data and power line. During normal operation of the pilot control unit 20, current is simply conducted through. However, a sensor 14 monitors the integrity of the external power supply 21 and conducts is measurement signals via a sensor line 15 to the control 19. During normal operation, moreover, the electrical energy store 10 is charged via a charging circuit 9, so that the energy store 10 is always fully charged shortly after the start of each operation, but is not overcharged. The electrical energy store 10 may contain as the electrical energy storage cell at least one accumulator 24 and/or at least one capacitor 23. Alternatively, however, as indicated in FIG. 3, a non-rechargeable battery 25 can also be used as the energy storage cell with a battery management 13, wherein the charging circuit 9 is then dispensed with. A voltage converter 12 is used to maintain a constant voltage during different voltage or charging states of the electrical energy store 10. This can be supported by a switch-on current limiter 8, so that excessively high switch-on currents do not occur. The control 19 is connected to all components via signal lines 18, so that these can preferably control all sequences that occur in the pilot control unit 20.

If the sensor 14 reports a fault in the external power supply 21 to the control 19, the control 19 switches by means of a changeover switch 7 from the external power supply 21 to a power supply by means of the electrical energy store 10. All actuators 3 are then supplied with power from the electrical energy store 10. At the same time, the control 19 interrupts the data supply line 16 and sends signals, in order to move the valve slide 5 into the cutout position or for an emergency cutout via the bidirectional data line 17. An optional suppressor circuit 6 prevents malfunctions in this process due to the external power supply 21. However, an emergency cutout may also be triggered, for example, if there are interruptions in the data supply line 16 or at another point in a data communication. However, the electrical energy store or the emergency power supply is not then needed.

In the case of a restart following an emergency cutout, the electrical energy store 10 (if it is discharged) is quickly recharged, so that safe operation is once again possible. The pilot control unit 20 can undertake yet further functions, for example the routine inspection of all data and signal lines and of the energy store 10. Exemplary calculations of typical hydraulic valves and actuators according to the prior art mean that the energy store 10 should have stored at least approx. 4 Ws [watt×second] for each valve and each emergency cutout. The capacity of the electrical energy store 10 can therefore be calculated according to the number of connected valves and the number of emergency cutouts required to be carried out and, of course, provided with a supplement for safety and for taking account of ageing of the energy store 10. A voltage drop taking place during the connection of the energy store 10 can be balanced by the voltage converter 12. As a result, an emergency power supply according to the invention should have an energy store 10 of at least 12 Ws, which can be achieved for the desired operating voltage, in particular 12 V [volt], by interposing so-called super capacitors and/or storage cells (e.g. lithium-ion storage batteries). The costs and other technical properties of these components determine the best route for energy storage in each application.

The control 19 (as has already been outlined above) is preferably realized on a microprocessor. The control 19 processes control commands for the hydraulic valves 1 received during routine operation from the pilot control unit 20 via the data supply line 16, in order to generate suitable activation signals for the actuators of the hydraulic valves or the power end stages thereof. For this purpose, the control 19 has a bidirectional data transmission 39 which manages a bus system for communication between the pilot control unit 20 and the electronics of the individual valve drives. Using the bidirectional data transmission 39, the actuator power line 31 is operated as a bidirectional data line 17, with which control data are transmitted to the hydraulic valve modules 41 or measurement data can be received from the hydraulic valve modules 41. The control 19 also has a parametrization module 28 in which operating parameters for each individual hydraulic valve 1 connected to the pilot control unit 20 can be stored. The parametrization module 28 can be parametrized via an interface 40 on the pilot control unit 20. In other words, operating parameters, characteristic fields, etc. can be processed or deposited in the parametrization module 28 via this interface 40. The control 19 also has a control loop 38. The control loop 38 is characterized in that taking account of the operating commands received via the data line 16, the parameters stored in the parametrization module 28 and taking account of measurement and sensor data received from the valve drive 2, or the electronics 26 thereof, via the bidirectional data line 17, suitable operating commands for the actuator 3 of the hydraulic valve or the power end stage thereof are generated. No further control loops 38 are needed in the individual hydraulic valve 1. The control loops 38 needed for controlled operation are completely realized in the pilot control unit 20 or are closed by the pilot control unit 20.

The present invention allows the particularly efficient parametrization of hydraulic valves, as a result of which valves of this kind can be applied more cost-effectively than with traditional pilot control units.

LIST OF REFERENCE SIGNS

1 Hydraulic valve
2 Valve drive
3 Actuator
4 Hydraulic valve block
5 Valve slide
6 Suppressor circuit
7 Changeover switch
8 Switch-on current limiter
9 Charging circuit
10 Power store, energy store
11 Status line 12 Voltage transformer
13 Battery management
14 Sensor
15 Sensor line
16 Data supply line
17 Bidirectional data line
18 Signal lines
19 Control
20 Pilot control unit
21 External power supply
22 Hydraulic lines
23 Capacitor
24 Storage battery
25 Battery
26 Electronics
27 Power end stage
28 Parametrization module
29 Control bore
30 Control structures
31 Actuator power line
32 Electric motor
33 Gear
34 Rack
35 Pinion
36 Microprocessor with data store
37 Supply channel
38 Control loop
39 Bidirectional data transmission
40 Interface
41 Hydraulic valve module

The invention claimed is:

1. A pilot control unit for at least one valve drive of a hydraulic valve with a valve slide,
   wherein the valve slide can be adjusted by the at least one valve drive, in order to supply hydraulic lines with hydraulic fluid through the hydraulic valve,
   wherein the pilot control unit is set up to supply electronics and a power end stage for actuating an electrical actuator of the at least one valve drive with electrical energy and operating commands via a parametrization module in the pilot control unit, in which operating parameters for operation of the at least one hydraulic valve by the at least one valve drive thereof are stored,
   wherein the pilot control unit has a control and an electrical energy store,
   wherein the electrical energy store is set up so that the valve slide is moved by the at least one valve drive and energy stored in the electrical energy store from any possible valve slide position into a cutout position,
   wherein the control is configured as an emergency control and the electrical energy store as an emergency power supply and they are set up to supply electrical energy for at least one emergency cutout, when a fault is detected in an external power supply of the hydraulic valve, and
   wherein the emergency cutout is set up to move the valve slide from any possible valve slide position into the cutout position.

2. The pilot control unit according to claim 1,
   wherein there is at least one control loop for controlling the at least one valve drive and a bidirectional data transmission to the at least one valve drive in the pilot control unit.

3. The pilot control unit according to claim 1,
   wherein a plurality of hydraulic valves is connected to the pilot control unit and can be supplied with data by said pilot control unit.

4. The pilot control unit according to claim 3,
   wherein the pilot control unit has a protective circuit and/or further joint components for multiple hydraulic valves.

5. The pilot control unit according to claim 1,
   wherein the pilot control unit has an interface for data exchange and/or reprogramming.

6. The pilot control unit according to claim 1,
   wherein the pilot control unit contains calibration data, parameters and control loops needed for the at least one valve drive, and
   wherein the pilot control unit is set up to operate the at least one valve drive as an actuating element of the control loops and to process actual values of the at least one valve drive.

7. The pilot control unit according to claim 1,
   wherein two or more of the functions of the parametrization module, the control, control loops and/or a bidirectional data transmission are integrated in a microprocessor with a data store.

8. The pilot control unit according to claim 1,
   wherein the pilot control unit is configured to:
   send, via a bidirectional data transmission, operating commands to the at least one valve drive; and
   receive, via the bidirectional data transmission, actual values of the hydraulic valve from the at least one valve drive,
   wherein the pilot control unit is configured as a separate unit apart from the valve drive, and
   wherein the pilot control unit is configured to use the operating parameters along with the actual values and external inputs to generate the operating commands.

9. A method of operating a valve drive for a hydraulic valve, comprising:
   receiving, at the valve drive receives via a bidirectional data transmission, operating commands from a pilot control unit,
   wherein the pilot control unit is configured as a separate unit apart from the valve drive; and
   sending, by the valve drive via the bidirectional data transmission, actual values of the hydraulic valve back to the pilot control unit,
   wherein the pilot control unit contains operating parameters stored in a parametrization module for the valve drive and the hydraulic valve; and
   wherein the operating parameters are used by the pilot control unit along with the actual values and external inputs to generate the operating commands.

10. The method according to claim 9,
    wherein the pilot control unit takes over control of the valve drive by means of control loops realized in the pilot control unit and the stored operating parameters and no control loops are realized in the valve drive itself and no operating parameters are stored.

11. The method according to claim 9,
    wherein the pilot control unit supplies a plurality of valve drives with operating commands in parallel or in series and stores operating parameters for all these valve drives.

12. A computer program product having a non-transitory computer readable medium that stores commands which, when executed by processing circuitry, cause the processing circuitry to perform a method of operating a valve drive of a hydraulic valve, the method comprising:
    receiving, at the valve drive via a bidirectional data transmission, operating commands from a pilot control unit, wherein the pilot control unit is configured as a separate unit apart from the valve drive; and sending, by the valve drive via the bidirectional data transmission, actual values of the hydraulic valve back to the pilot control unit, wherein the pilot control unit contains operating parameters stored in a parametrization module for the valve drive and the hydraulic valve; and wherein the operating parameters are used by the pilot control unit along with the actual values and external inputs to generate the operating commands.

* * * * *